United States Patent [19]

Maeno et al.

[11] Patent Number: 5,717,315
[45] Date of Patent: Feb. 10, 1998

[54] CHECK APPARATUS FOR CAMERA CAPABLE OF USING ONE OF DIFFERENT TYPES OF POWER SOURCES

[75] Inventors: Hitoshi Maeno; Chizuru Ishizaka, both of Tokyo, Japan

[73] Assignee: Olympus Optical Co., Ltd., Tokyo, Japan

[21] Appl. No.: 510,694

[22] Filed: Aug. 3, 1995

[30] Foreign Application Priority Data

Aug. 23, 1994 [JP] Japan .................... 6-198819

[51] Int. Cl.⁶ ............................... H01M 10/46
[52] U.S. Cl. ..................... 320/106; 320/DIG. 21
[58] Field of Search ........................ 320/106, 2, 5, 320/6, 9, DIG. 21, 30, 35, 48, 56; 429/61, 90; 324/426, 431; 354/484

[56] References Cited

U.S. PATENT DOCUMENTS

| | | | |
|---|---|---|---|
| 4,376,265 | 3/1983 | Kiuchi et al. | 324/426 |
| 4,792,762 | 12/1988 | Shiina et al. | 324/426 |
| 5,200,686 | 4/1993 | Lee | 320/2 |
| 5,206,097 | 4/1993 | Burns et al. | 320/48 X |
| 5,298,346 | 3/1994 | Gyenes | 429/90 |
| 5,473,262 | 12/1995 | Yoshimatsu | 320/48 X |

FOREIGN PATENT DOCUMENTS

5-249637  9/1993  Japan .

*Primary Examiner*—Edward Tso
*Attorney, Agent, or Firm*—David E. Dougherty

[57] ABSTRACT

A power source check apparatus of a camera capable of using one of different type of batteries or battery packs detects the type of the power source used, and checks residual capacity of the power source by measuring the terminal voltage of the power source while applying suitable dummy load current in accordance with the detected type of the power source. The type of the power source is detected on the basis of any one of open circuit terminal voltage, appearance, or data code provided therein.

7 Claims, 12 Drawing Sheets

CHECK APPARATUS FOR CAMERA CAPABLE OF USING ONE OF DIFFERENT TYPES OF POWER SOURCES

BACKGROUND OF THE INVENTION

1. Field of the Invention

The present invention relates generally to an apparatus for checking a battery of a camera, and more particularly to a power source check apparatus on a camera which is capable of using one of different types of batteries or battery packs.

2. Description of the Related Art

Battery check apparatus for a camera which is capable of using one of different types of batteries have been used without changing measuring conditions for a power source loaded in the camera. In such a camera, the measuring condition for the type of the battery such as a dummy loading resistance and a reference voltage for judging, warning or locking have been kept constant. Japanese unexamined PATENT PUBLICATION 5-249537 discloses a battery check apparatus of a camera, which measures a secondary battery by measuring both charging and discharging current of the battery and accumulating the measurements sequentially to determine residual capacity of the secondary battery which is loaded in the camera.

However, there is considerable difference in determining the exhaust voltage between a lithium primary battery and a lithium ion secondary battery. For example, the exhaust voltage of the lithium ion secondary battery is higher than that of the lithium primary battery. If a battery check apparatus of a camera is capable of using both the lithium primary battery and the lithium ion secondary battery, it is made to measure the lithium primary battery used in the camera with a measuring condition suitable only for the lithium ion secondary battery, then the camera cannot give full scope to the lithium primary battery, because of judging the battery as being exhausted by its low voltage even though the lithium primary battery has enough residual capacity.

On the other hand, when applying the capacity measuring method for the secondary battery disclosed in the Japanese laid open PATENT PUBLICATION 5-249537, means for measuring the charging and discharging current of the battery is required. However, it is not an effective design in production cost.

SUMMARY OF THE INVENTION

The object of the present invention is to provide a check apparatus for a camera which is capable of using one of different types of power sources, which detects the type of power source used and sets suitable measuring condition for the type of the power source.

In order to achieve the above-mentioned object, a check apparatus of a camera capable of using one of different type of power sources, comprises connecting means for connecting both terminals of the power source loaded in the camera to an electric circuit provided in the camera, judging means for judging the specific type of the power source connected to the connecting means, and checking means for checking residual capacity of the power source with setting suitable measuring condition on the basis of the output of the judging means.

As a result, the type of the power source loaded in the camera is detected and accordingly a measuring condition is selected suitably for the type of the power source used, so that the camera can give full scope to the ability of the power source.

These and other objects and features of this invention will be better understood by the description of the preferred embodiments given below.

BRIEF DESCRIPTION OF THE DRAWINGS

The present invention will be more apparent from the following detailed description, when taken in conjunction with the accompanying drawings, in which.

DESCRIPTION OF THE PREFERRED EMBODIMENTS

The preferred embodiments of the present invention will be explained below with reference to the accompanying drawings. In the following description for the embodiments, the batteries and the battery packs are both expressed in a term power sources.

Figure 1:
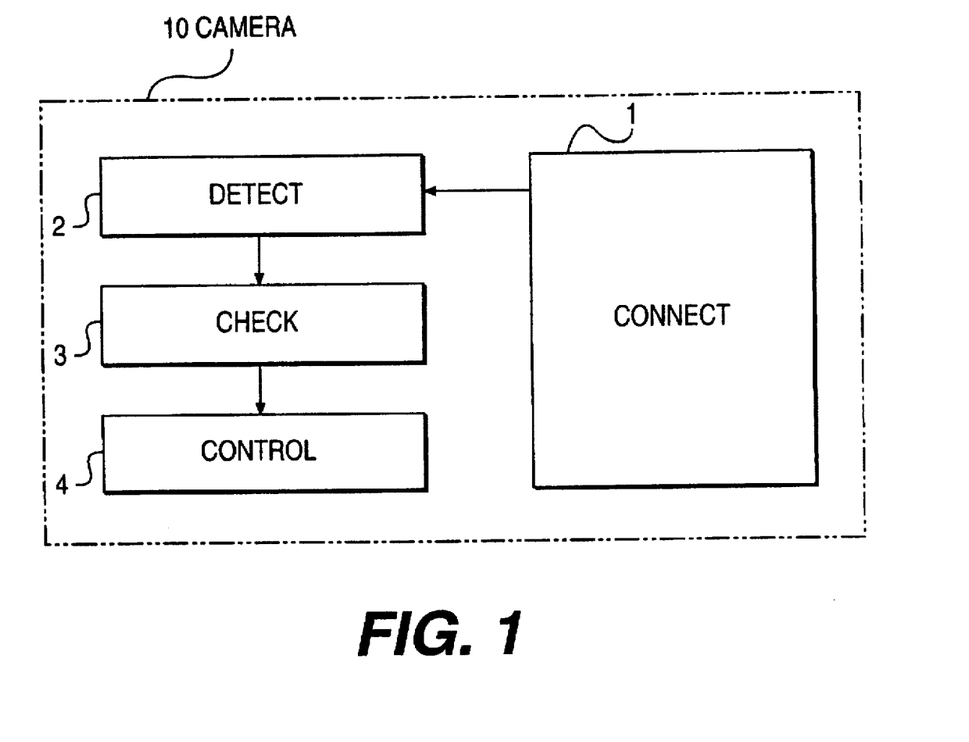
FIG. 1 illustrates a conceptual block diagram of a power source check apparatus of the present invention.

FIG. 1 illustrates a conceptual block diagram of a power source check apparatus of a camera according to the present invention. The power source check apparatus of the camera 10 has a connecting means 1 for connecting one of a plurality of types of power sources loaded into the camera 10, a detecting means 2 for detecting a type of the power source connected to the connecting means 1, a check portion 3 for measuring remaining capacity of the power source by applying a measuring condition suitable for the type of the power source, and an operation control portion 4 for generating an enabling signal or a disabling signal to a controller of the camera 10 on the basis of an output of the check portion 3.

As a result, the type of the power source connected to the connecting means 1 is detected by the detecting means 2, so that the power source measuring condition suitable for the type of the power source is set on the basis of an output of the detecting means 2. The residual capacity of the power source is measured by the check portion 3 by applying a suitable measuring condition for the type of the power source. The operation control portion 4 generates an enabling signal to the controller of the camera 10 if the measurements of the power source is higher than a predetermined reference level, and generates a disabling signal to the controller of the camera if the measurements of the power source is lower than the predetermined reference level.

(FIRST EMBODIMENT)

A first embodiment of the present invention will be explained below. A power source check apparatus of the first embodiment detects the type of the power source loaded in a camera by using a detecting part for measuring an open circuit voltage of the power source, the power source check apparatus measures residual capacity of the power source on the basis of information concerning the type of the power source. The detecting part can also measure a closed circuit voltage of the power source by applying a predetermined load instead of measuring the open circuit voltage, so that the residual capacity of the power source can be also measured on the basis of the closed circuit voltage of the power source by applying a predetermined load.

Figure 2:
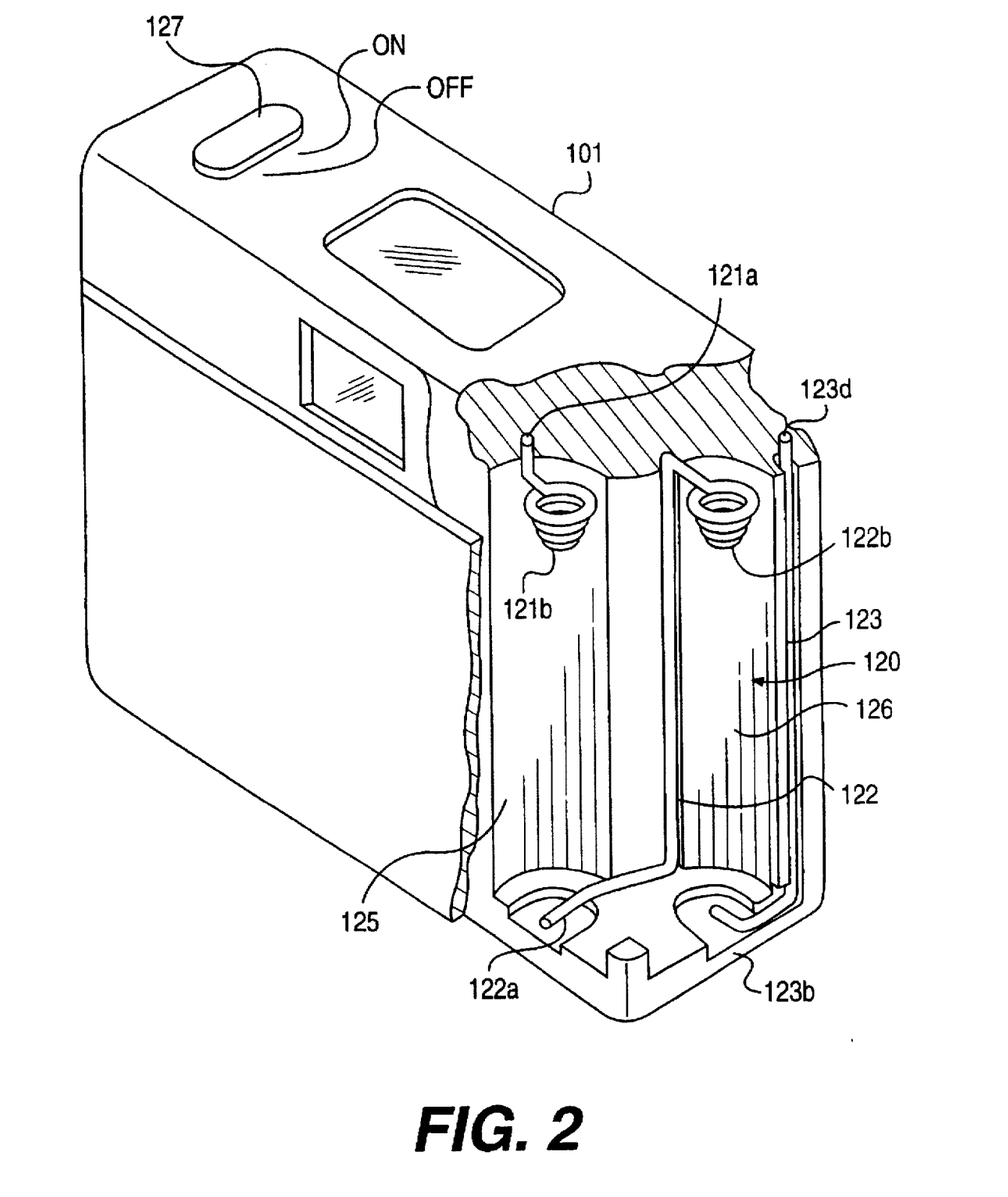
FIG. 2 shows a perspective view around a power source loading chamber of a camera of the first embodiment.

FIG. 2 shows a perspective view around a power source loading chamber of the first embodiment. Wall portions 125 and 126 of the power source loading chamber provided on the camera body 101 have suitable radius enough to fit with both a lithium primary battery and a lithium ion secondary battery. Both the lithium primary battery and the lithium ion secondary battery can be loaded into the camera by directing their positive terminals downwardly. A negative terminal of the battery loaded in the wall 125 side contacts with a contact portion 121b of a contact member 121, and a positive terminal of the battery contacts with a contact portion 122a of a contact member 122. A negative terminal of the battery loaded in the wall 126 side contacts with a contact portion 122b of a contact member 122, and a positive terminal of the battery contacts with a contact portion 123b of a contact member 123.

As the contact portion 121a of the contact member 121 and the contact portion 123d of the contact member 123 are both connected to a circuit board provided in the camera, so that the working current will flow into the circuit board when turning on a power switch 127 on the camera.

Figure 3:
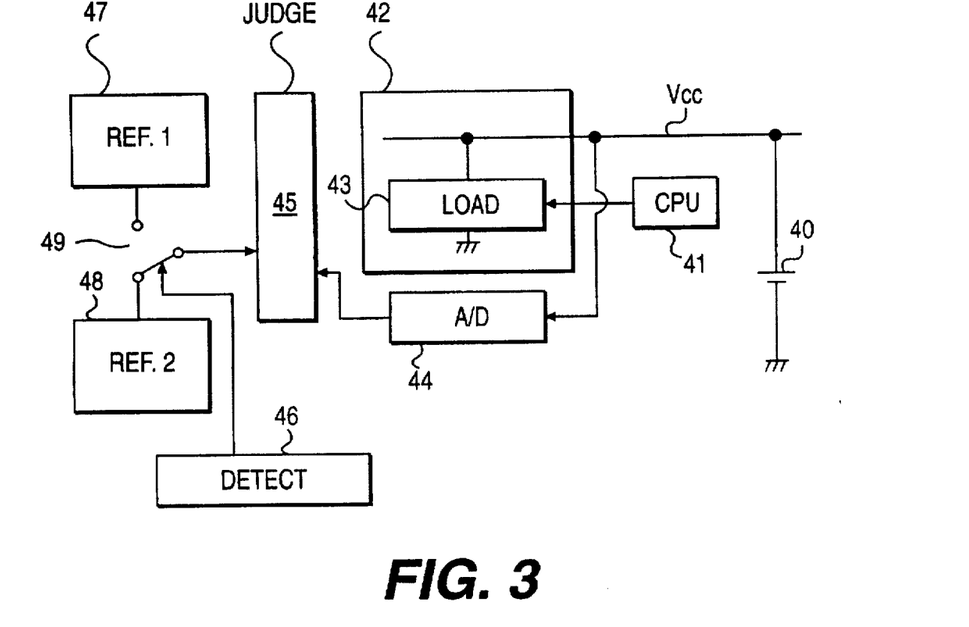
FIG. 3 illustrates a block diagram of a power source check circuit of the first embodiment.

FIG. 3 illustrates a block diagram of a power source check circuit of the first embodiment provided on the circuit board. The power source check circuit is controlled by a CPU 41 which is a microcomputer for controlling the whole operation of the camera. In the power source check circuit, the positive voltage line Vcc of the power source 40 loaded in the camera is connected to both an A/D converter circuit 44 and a dummy load circuit 42 which has a constant current load device 43, where the A/D converter circuit 44 and the dummy load circuit 42 construct a power source check means. The dummy loading current of the constant current load device 43 is controlled by the CPU 41 as a measuring condition.

The output of the A/D converter circuit 44 is connected to a power source judging circuit 45, and a power source check routine is performed. When the type of the power source is detected by the detecting circuit 46, any one of power source check reference voltages which is suitable for the type of the power source is selected by a switch 49. For example, a reference voltage of the lithium primary battery is set in one power source check reference voltage 47, and the other reference voltage of the lithium ion secondary battery is set in the other power source check reference voltage 48. The power source judging circuit 45 compares the selected power source check reference voltage with the A/D converted data of the power source voltage, and judges remaining capacity of the power source loaded in the camera.

Figure 4:
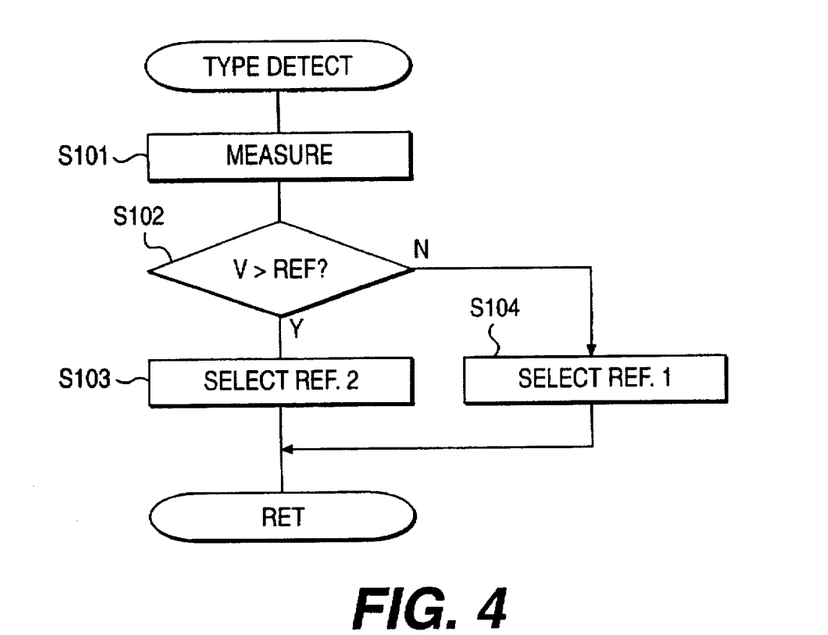
FIG. 4 shows a flowchart of a subroutine power source type detection.

FIG. 4 shows a flowchart of a subroutine type detection of the power source. The subroutine type detection of the power source is executed whenever the power switch 127 is turned on. In the step S101, the open circuit voltage of the power source is measured to provide a digital signal concerning the open circuit voltage of the power source, and the digital signal is sent to the CPU 41. The CPU 41 compares the detected signal with a predetermined reference value which is given for judging the type of the power source in the step S102, where the predetermined reference value will be described later.

If the open circuit voltage is higher than the predetermined reference value, the flow proceeds to the step S103, the CPU 41 selects the second reference voltage 48 which is suitable for the lithium ion secondary battery, and terminates this subroutine. If the measured open circuit voltage is lower than the predetermined reference value, the flow proceeds to the step S101, the CPU 41 selects the first reference voltage 47 which is suitable for the lithium primary battery, and terminates this subroutine.

The above-mentioned predetermined reference value in the step S102 will be described below. This reference value is set at the initial open circuit voltage of the lithium primary battery by the following reason. That is, the open circuit voltage of the lithium primary battery never exceeds the predetermined reference voltage, and the open circuit voltage of the lithium ion secondary battery never fall below the predetermined reference voltage because circuitry protection should be activated before the open circuit voltage falls below the predetermined reference voltage.

Assuming that the initial open circuit voltage of the lithium primary battery is about 3.2 volt, and the initial open circuit voltage of the lithium ion secondary battery is about 4.2 volt and its terminating voltage is about 3.3 volt, therefore, the predetermined reference voltage in the step S102 is set to 3.2 volt.

Figure 5:
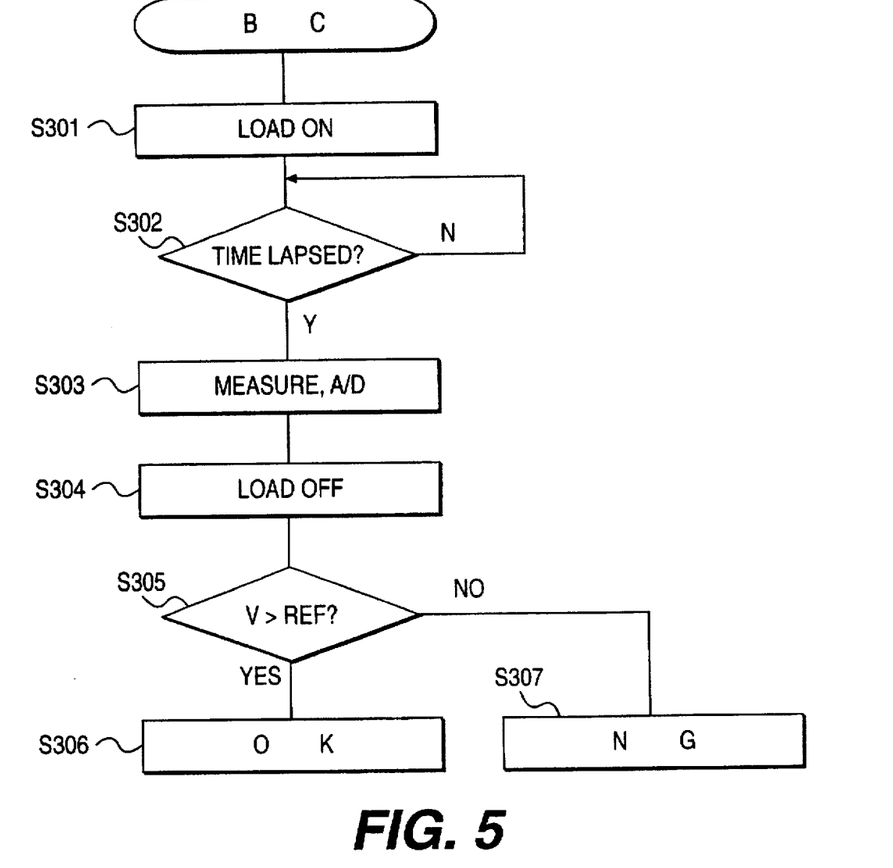
FIG. 5 shows a flowchart of a subroutine power source check.

FIG. 5 shows a flowchart of a subroutine power source check. Preceding this subroutine, the suitable predetermined power source check reference level is set in the power source check judging circuit 45 on the basis of output of type detection of the power source. In the step S301, the CPU 41 activates the constant current load 43 in the dummy load circuit 42, the power source is applied the dummy load. The CPU 41 waits for a predetermined lapse of time in the step S302. The voltage of the power source with applying the dummy load is measured by the A/D converter circuit 44 in the step S303. The CPU 41 stops applying the dummy load to the power source in the step S304.

In the step S305, digital value of the power source voltage is compared with the power source check reference level. If the measured power source voltage is higher than the reference level, then the flow proceeds to the step S306, and allows continued operation of the camera. On the other hand, if the measured power source voltage is lower than the reference level, then the flow proceeds to the step S307, and prohibits the continued operation of the camera. When setting the reference level on the basis of the type of the power source at the step S305, it is required that the power source check level is set to either the power source consists of the lithium primary battery or the lithium ion secondary battery.

As described above, the camera according to the first embodiment detects the type of the power source loaded in the camera, and selects the power source check reference level on the basis of the detected type of the power source, so that the camera can determine the residual capacity of the power source accurately, and also can give full scope to the ability of the type of the power source.

(SECOND EMBODIMENT)

A second embodiment of the present invention will be described below. In the camera of the second embodiment, the power source check reference level is kept constant and varying the measuring condition as the parameter of the dummy load by selecting the dummy load current on the basis of the type of the power source.

Figure 6:
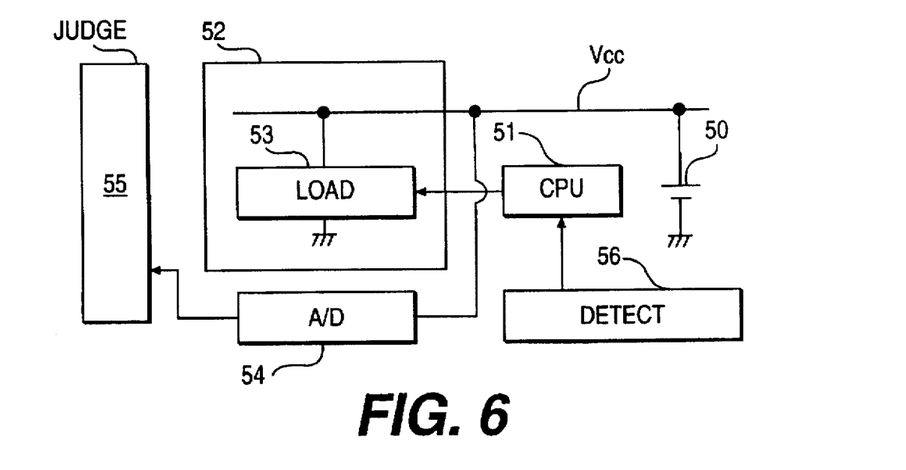
FIG. 6 illustrates a block diagram of a power source check circuit of the second embodiment.

FIG. 6 illustrates a block diagram of a power source check circuit of the second embodiment. The power source type detecting circuit 56 detects the type of the power source 50. The CPU 51 sets dummy load current driven by the constant current load circuit 53 on the basis of the output of the detecting circuit. The dummy loading is performed by the CPU 51 in the manner that the output current of the constant current load circuit 53 is lowered for the lithium primary battery and raised for the lithium ion secondary battery, because terminal voltage of the lithium primary battery is lower than that of the lithium ion secondary battery.

A predetermined time lapse after applying the dummy load is set by the CPU 51, the voltage of the power source 50 is sampled by the A/D converter 54, the residual capacity of the power source being evaluated by comparing the power source voltage with the predetermined power source check reference level.

As the camera of the second embodiment adjusts the amount of the dummy load current on the basis of detecting the type of the power source, so that suitable power source voltage is obtained on the basis of the type of the power source. As a result, the power source check operation is carried out accurately.

Figure 7:
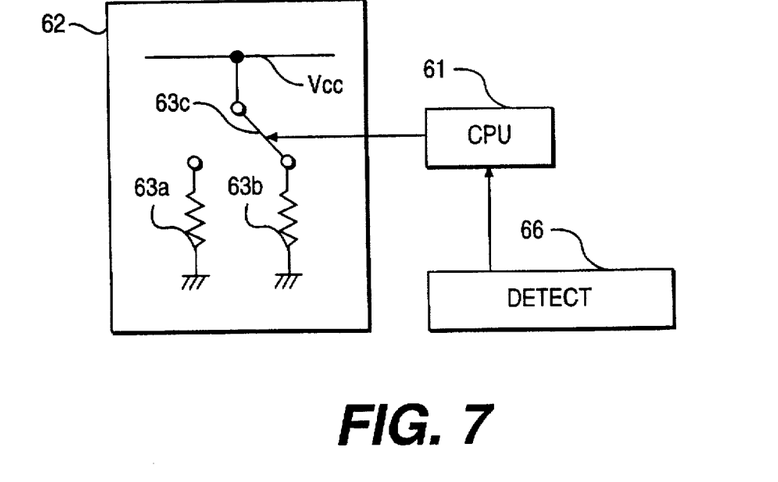
FIG. 7 illustrates a modified dummy load circuit of the second embodiment.

FIG. 7 illustrates a modified dummy load circuit of the second embodiment. The dummy load circuit selects one of the dummy load resisters provided in a dummy load circuit 62 on the basis of the type of the power source. Dummy load resisters 63a and 63b corresponding to the type of the power source are provided along the load current path in parallel in the dummy load circuit 62. Judging the type of the power source, the CPU 62 selects any one of the dummy load resisters 63a and 63b by activating a switch 63c. After setting the switch 63c, the power source check operation is carried out similarly to that of the second embodiment.

Another modification can be allowed by setting the dummy load current of the dummy load circuit to be constant, and changing the dummy loading lapse of time on the basis of the type of the power source.

(THIRD EMBODIMENT)

A third embodiment of the present invention will be described below. In the camera of the third embodiment, a power source check apparatus includes a detecting means for judging the type of the power source by reading out at least one bit of data code recorded on the outer surface of the power source.

Figure 8:
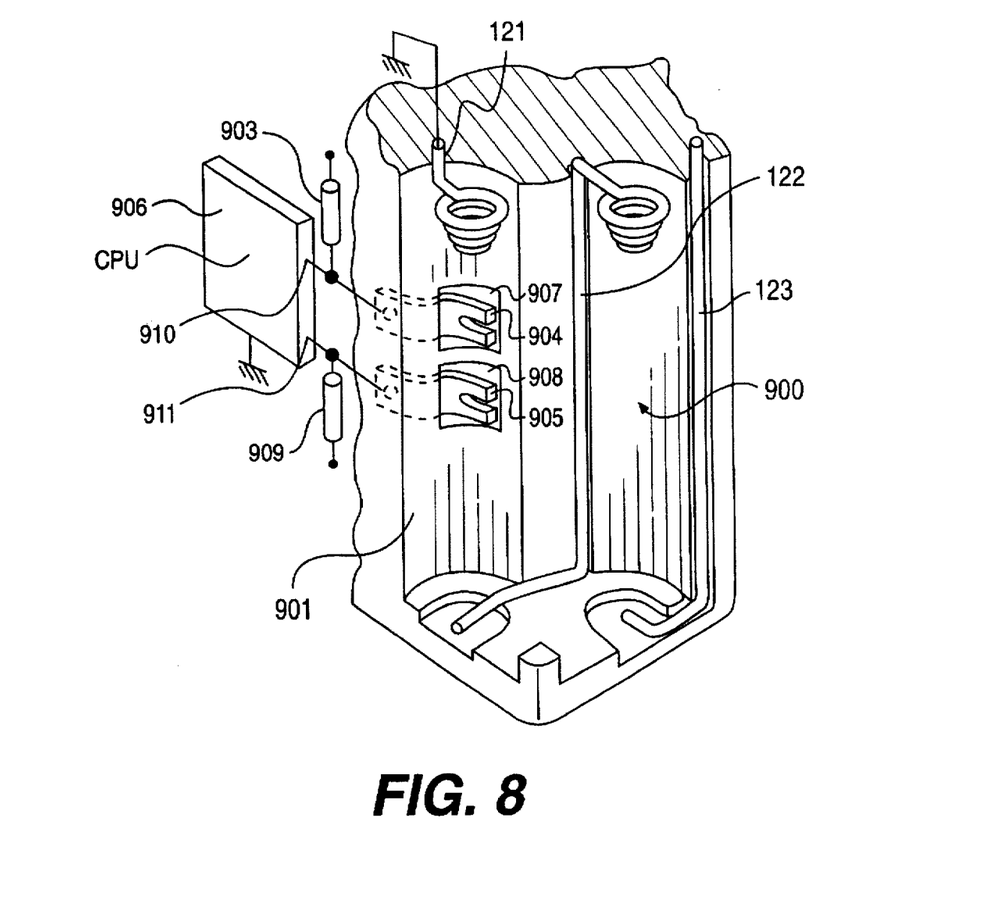
FIG. 8 shows a perspective view around a power source loading chamber of a camera of the third embodiment.
Figure 9:
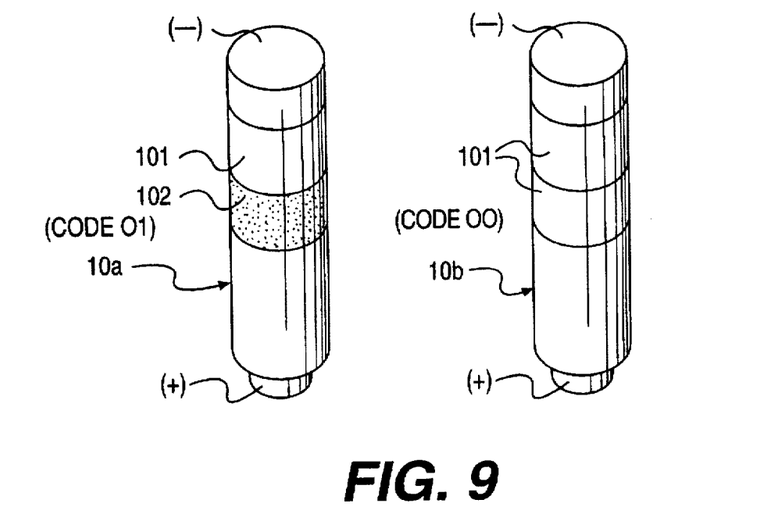
FIG. 9 illustrates an appearance of the power sources, in which (A) shows a lithium primary battery, and (B) shows a lithium ion secondary battery, respectively.

FIG. 8 shows a perspective view around a power source loading chamber of a camera. FIG. 9 illustrates external appearances of the power sources, in which FIG. 9(A) shows a lithium primary battery, and FIG. 9(B) shows a lithium ion secondary battery, respectively. In a power source loading chamber 900 shown in FIG. 8, power source contact members 121, 122, and 123 are provided as power source contacting means similar to that of the FIG. 2. Battery data code contacts 904 and 905 allowed to be elastically deformed are provided on the back face of the wall 901 of the chamber 900, and connected to the CPU 906. The power source data code contacts 904 and 905 are mounted via square openings 907 and 908 of the wall 901, being slightly projecting toward the power source chamber 900.

Pull up resisters 903 and 909 are connected to a line between the contact 904 and the CPU 906 and a line between the contact 905 and the CPU 906, respectively, the lines are pulled up to the Vcc line of the camera via the pull up resisters.

FIG. 9 illustrates the external appearances of the power sources applicable to a camera of the third embodiment. For example, FIG. 9(A) shows a lithium primary battery, and FIG. 9(B) shows a lithium ion secondary battery, respectively. When any one of the power sources is loaded into the camera, the power source data code contacts 904 and 905 contact to a conductive pattern 101 or an insulating pattern 102 provided on the surface of the power source. Assuming that the conductive pattern 101 is connected to the negative terminal of the power source.

When loading the lithium primary battery 10a into the power source chamber 901, the state of an input terminal 910 of the CPU 906 becomes low level, and an input terminal 911 of the CPU 906 becomes high level, then the CPU 906 recognizes the power source data code as "0138", so that type of the power source loaded in the camera is identified as the lithium primary battery. Similarly, when loading the lithium ion secondary battery 10b into the power source chamber 901, the state of an input terminal 910 of the CPU 906 becomes low level, and an input terminal 911 of the CPU 906 becomes low level, then the CPU 906 recognizes the power source data code as "00", so that type of the power source loaded in the camera is identified as the lithium ion secondary battery.

Figure 10:
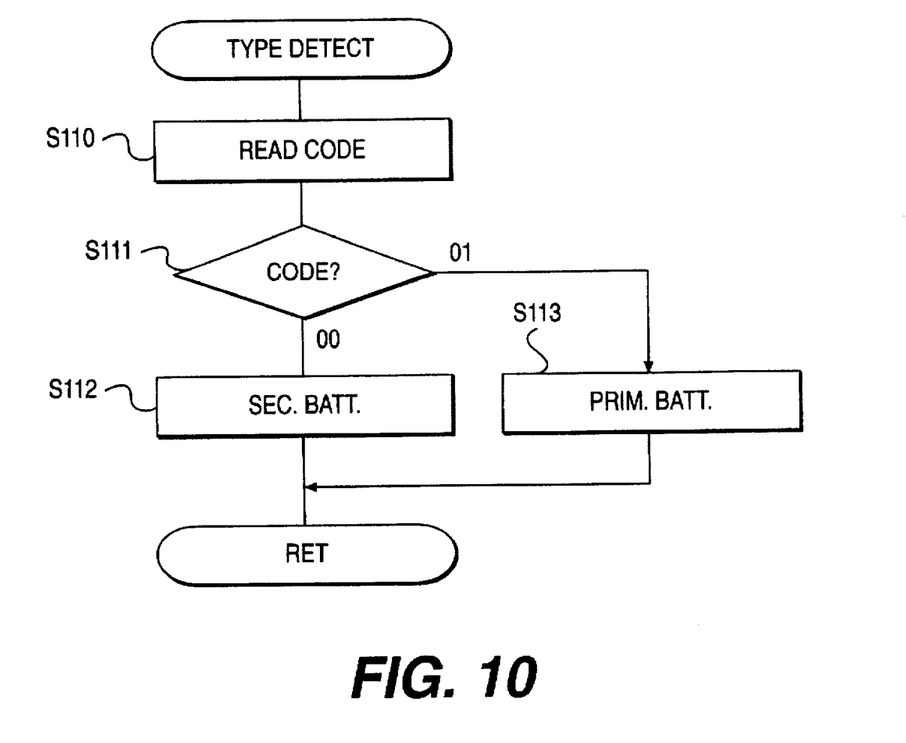
FIG. 10 shows a flowchart of a subroutine power source type detection.

A battery type detecting process according to the third embodiment will be described below with reference to the flowchart of FIG. 10. The data code of the power source loaded in the camera is read out in the step S110. The data code of the power source is identified in the step S111. If the data code is "00", the flow proceeds to the step S112, and the CPU judges the power source as the lithium ion secondary battery. If the data code of the power source is "01", the flow proceeds to the step S113, and the CPU judges the power source as the lithium primary battery. The type of detecting process of the power source is followed by the power source checking process similar to that of the first embodiment.

The camera of the third embodiment reads out the conductive pattern provided on the surface of the power source by means of putting, printing, or molding, and detects the conduction state, so that it requires low production cost and assures certain type judgment of the power source.

A modified detection circuit of the third embodiment utilizes an optical sensing device such as a photo-reflector, which detects data code on the power source optically. Data code reading error caused by bad contact of the detecting switches can be avoided by this modified detection circuit of the third embodiment.

(FOURTH EMBODIMENT)

A fourth embodiment of the present invention will be described below. In the camera of the fourth embodiment, a power source check apparatus judges the type of the power source by detecting the appearance of the power source.

Figure 11:
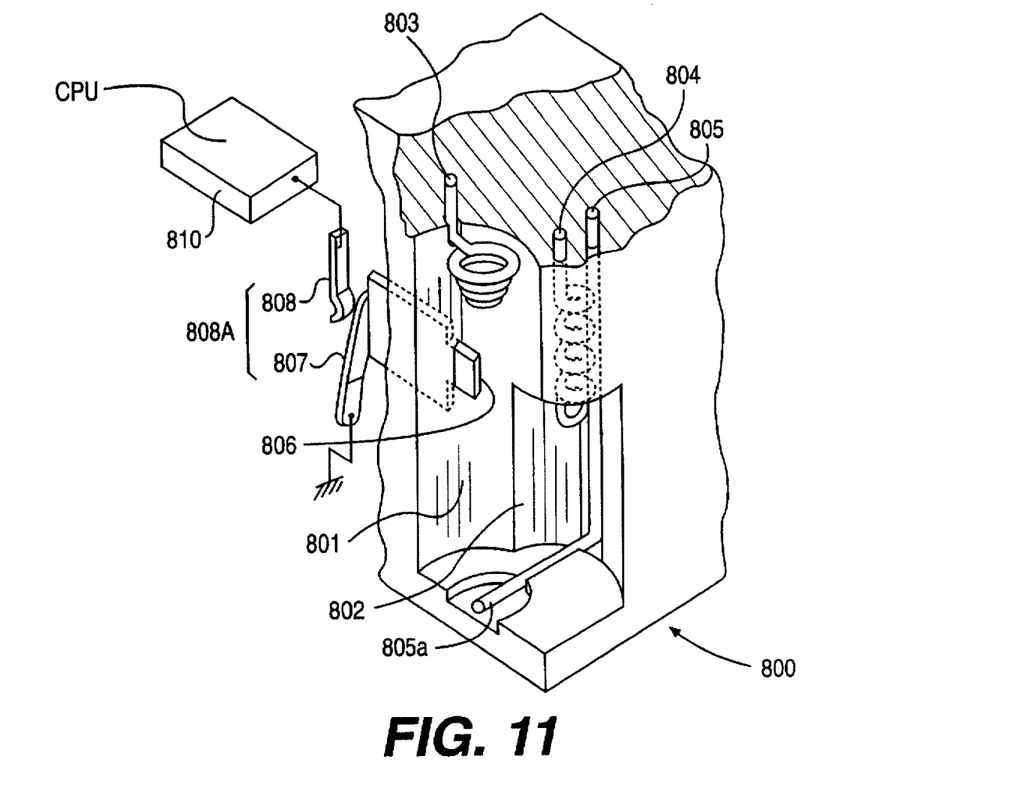
FIG. 11 shows a perspective view around a power source loading chamber of a camera of the fourth embodiment.

FIG. 11 shows a perspective view of a power source loading chamber of the fourth embodiment. FIG. 12 illustrates the appearance of the power sources, in which FIG. 11(A) shows a lithium ion secondary battery, and FIG. 11(B) shows a lithium primary battery, respectively.

Figure 12A:
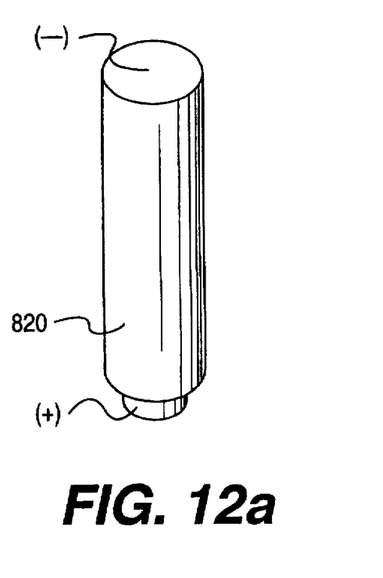
FIG. 12 illustrates an appearance of power sources, in which (A) shows a lithium ion secondary battery, and (B) shows a lithium primary battery, respectively.
Figure 12B:
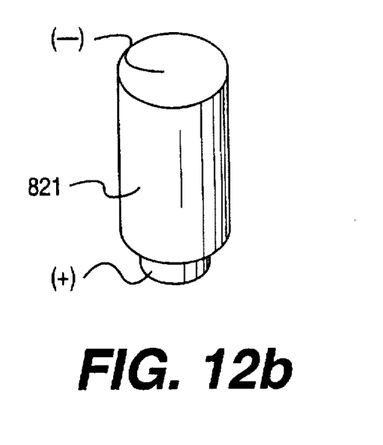

The power source loading chamber 800 has a compatible design for accepting either the lithium primary battery or the lithium ion secondary battery. A wall 801 of the power source loading chamber 800 has a shape suitable for loading the lithium ion secondary battery 820 as shown in FIG. 12(A). On the other hand, a wall 802 of the power source loading chamber 800 has a shape suitable for loading the lithium primary battery 821 as shown in FIG. 12(B).

A contact portion 805a of a positive contact member 805 can contact both the lithium primary battery 821 and the lithium ion secondary battery 820. A negative contact member 803 as the other contact means can contact the lithium ion secondary battery 820, and a negative contact member 804 can contact the lithium primary battery 821, respectively.

A power source detecting member 806 of a power source judging means is provided on the wall 801, which is retractable into the wall 801 and a tip portion thereof extends into the power source loading chamber 800 when no power source loaded. A ground contact member 807, which consists of a detecting switch 808a of the power source judging means is an elastic deformable conductor touching the power source detecting member 806 with one end thereof being connected to the ground. It provided on the back side of the power source loading chamber 800. There is no power source detecting member on the wall 802 as described above.

When the lithium ion secondary battery is loaded on the wall 801 of the power source loading chamber 800, the power source detecting member 806 is retracted, and the ground contact member 807 touches a contact member 808 which consists of the detecting switch 808a of the power source judging means. The contact member 808 is connected to the CPU 810 which detects the power source i.e. the lithium ion secondary battery by reading out ON state of the power source detecting switch 808a.

Figure 13:
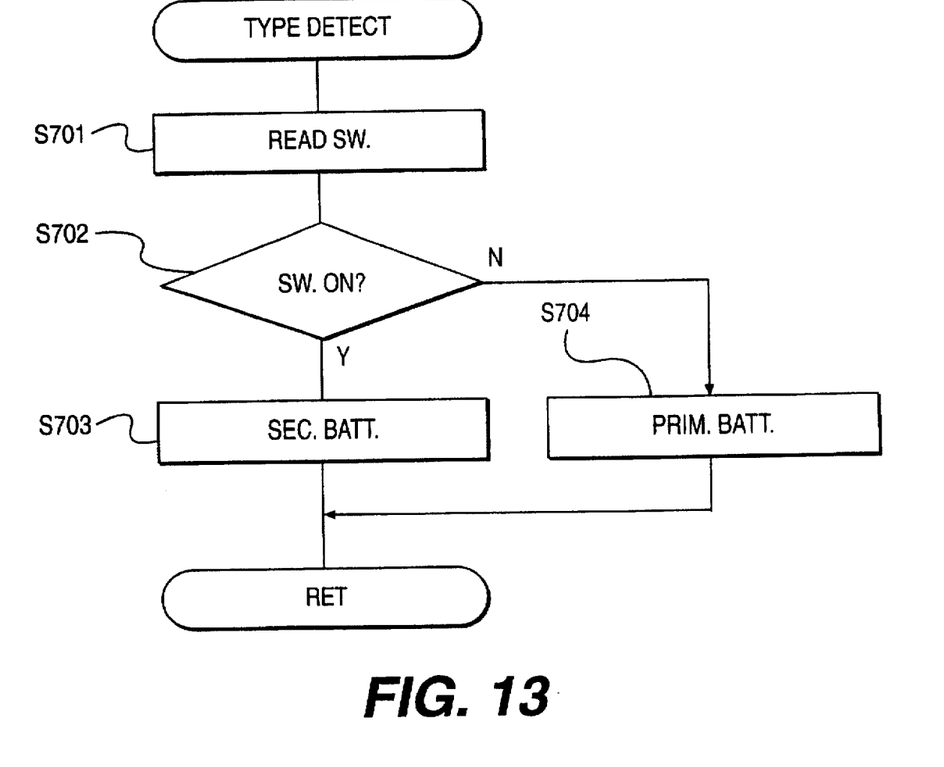
FIG. 13 shows a flowchart of a subroutine power source type detection.

Battery judge processing in a power source check routine of the fourth embodiment will be described below with reference to FIG. 13. In the step S701, the CPU 810 reads out the state of the power source detecting switch 808a. In the step S702, the CPU 810 judges the type of the power source loaded in the camera on the basis of the state of the detecting switch 808a. If the power source is the lithium ion secondary battery, then the power source detecting member 806 is retracted and the detecting switch 808a being in an ON state, so that the CPU 810 judges the power source as the lithium ion secondary battery and the flow proceeds to the step S703. Similarly, if the power source loaded in the camera is the lithium primary battery, then the power source detecting member 806 is not retracted and the detecting switch 808a being OFF state, so that the CPU 810 judges the power source as the lithium primary battery and the flow proceeds to the step S704. The power source check process will follow similar to the first embodiment. In the fourth embodiment, the type of the power source is detected by difference in the appearances of the power sources, so that it is practical to utilize off the shelf power sources.

(FIFTH EMBODIMENT)

The fifth embodiment of the present invention will be described below. A power source check apparatus of the fifth embodiment utilizes battery packs including a ROM (Read Only Memory device) which has a specific data code of more than a bit, and the type of the power source is detected by reading out the specific data code thereof.

Figure 14:
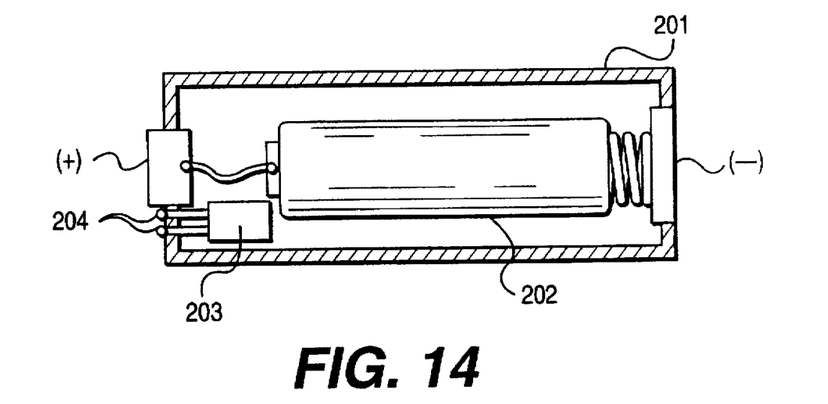
FIG. 14 shows cross sectional view of the power source pack of the fifth embodiment.
Figure 15:
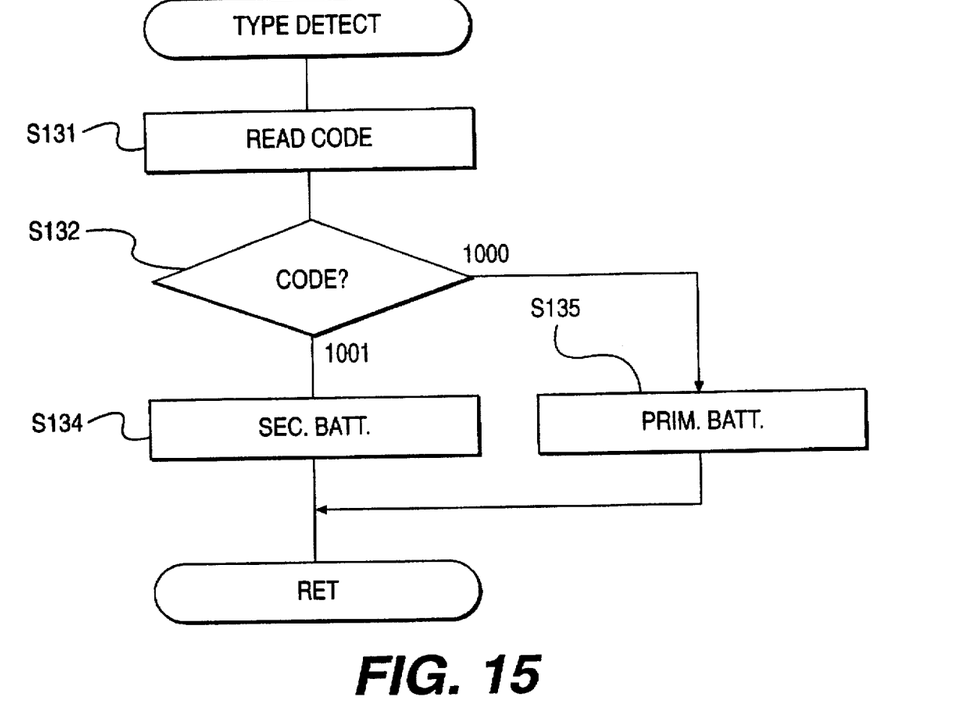
FIG. 15 shows a flowchart of a subroutine power source type detection of the fifth embodiment.

FIG. 14 shows a cross-sectional view of the power source pack of the fifth embodiment. FIG. 15 shows a flowchart of a subroutine type detection of the power source of the fifth embodiment. The type of power source 202 is contained in the battery pack 201 as shown in FIG. 14. The positive and the negative terminals of the power source 202 are connected to the positive and the negative terminals of the battery pack 201, respectively. The ROM 203 storing specific data code of more than a bit which denotes the type of the power source is also included in the battery pack 201. Communication lines of the ROM 203 are connected to a terminal 204 on the battery pack 201.

Loading the battery pack 201 into the camera, the ROM 203 is connected to the CPU provided inside of the camera, so that the CPU can read out the specific data code stored in the ROM 203. The battery pack 201 utilizes either a lithium primary battery or a lithium ion secondary battery, for example, assuming the specific data code of the lithium primary battery for "1000",and the lithium ion secondary battery for "1001".

Processing of judging the type of the above mentioned battery pack 201 will be described below with reference to FIG. 15. The CPU reads out the specific data code stored in the ROM 203 in the step S131, and judges the code in the step S132. If the read out code is "10000",then the CPU judges the battery pack 201 as the lithium primary battery, and the flow proceeds to the step S135. If the read out code is "1001",then the CPU judges the battery pack 201 as the lithium ion secondary battery, and the flow proceeds to the step S134. The power source check process follows similar steps to the first embodiment. In the fifth embodiment, the type of the power source is detected by the specific data code stored in the ROM, so that accurate judging is performed, and a simple arrangement is allowed because no power source detecting member is required around the power source loading chamber of the camera.

(SIXTH EMBODIMENT)

Figure 16:
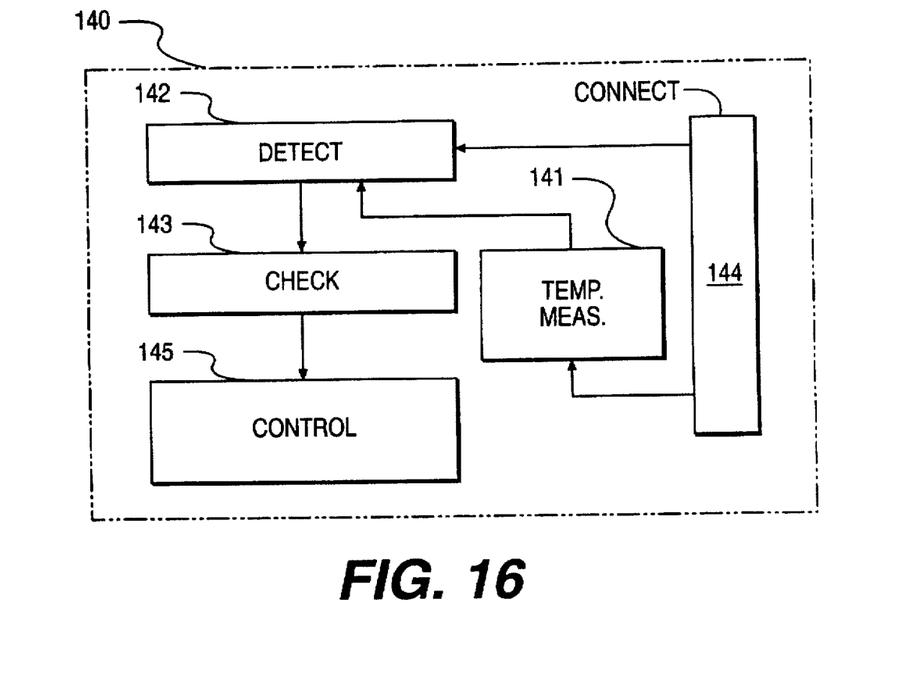
FIG. 16 illustrates a block diagram of a power source check apparatus of the sixth embodiment.

The sixth embodiment of the present invention will be described below. In the first embodiment, the power source check level referred in the power source check means 3 in FIG. 1 is assumed suitably selected by the type of the power source, however, the camera of the sixth embodiment changes over the measuring condition on the basis of the type and surface temperature of the power source. In FIG. 16, the added functional blocks to FIG. 1 will be described.

A surface temperature measuring block 141 measures surface temperature of the power source, and sends the temperature information to the type judging block 142. The type of the power source is judged on the basis of the surface temperature and other information received via the connecting portion 144. The power source check reference level is selected on the basis of the type of the power source, and power source check process being carried out. The operation of the controller 145 of the camera is determined on the basis of measurements of the power source check process.

Figure 17:
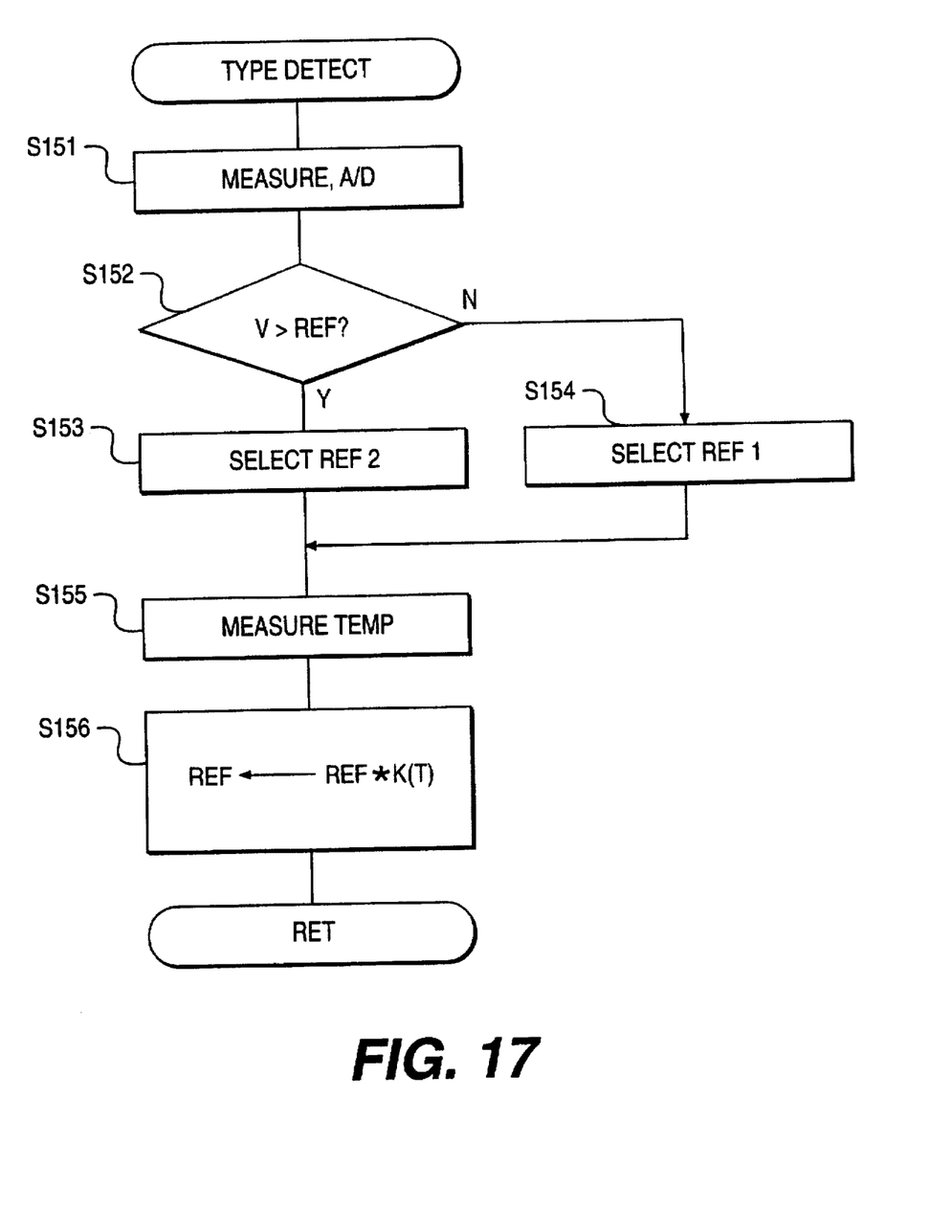
FIG. 17 shows a flowchart of a subroutine power source type detection of the sixth embodiment.

Battery type judging routine of the type judging block 142 will be described below with reference to FIG. 17. The processing steps from S151 to S154 are similar to that of FIG. 4 in the first embodiment. Selecting power source check reference level suitable for the type of the power source, in the step S155, the surface temperature measuring block 141 measures surface temperature of the power source. In the step S156, the CPU carries out an operation to determine the power source check reference level. The reference level calculating formula is given below.

$$(reference\ level) = (selected\ level) * K(T)$$

where, the selected level is set on the basis of the type of the power source, and K(T) is a coefficient as a function of the temperature measurements. Obtaining the power source check reference level by the formula given above, the power source check process will follow. In the sixth embodiment, determining the power source check reference level for evaluating the power source remaining capacity, the reference level is made to compensate on the basis of the temperature measurements, so that a suitable power source check reference level is obtained.

(MODIFIED EMBODIMENTS)

Figure 18A:
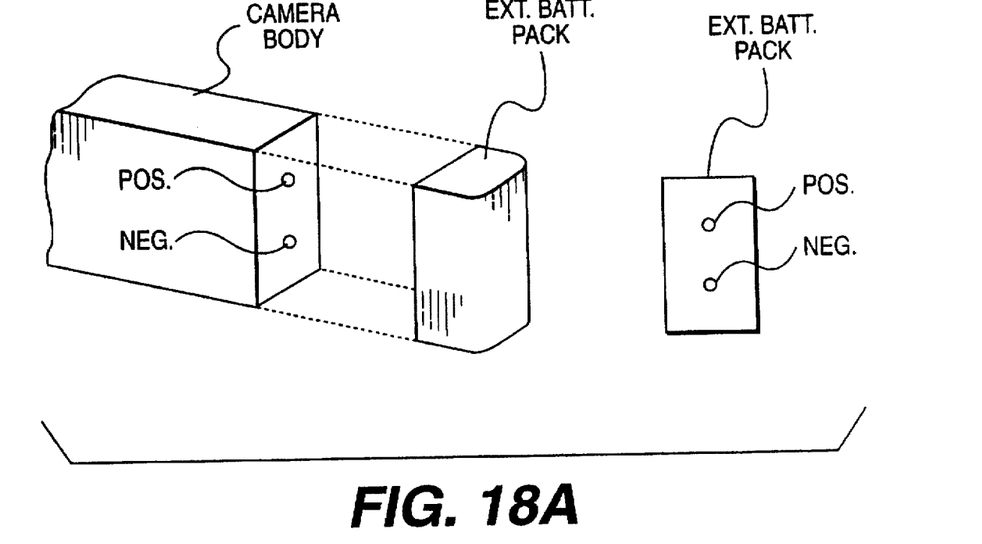
FIGS. 18A & B and 19A & B show methods of battery pack connection to the camera body of the modified embodiments.
Figure 18B:
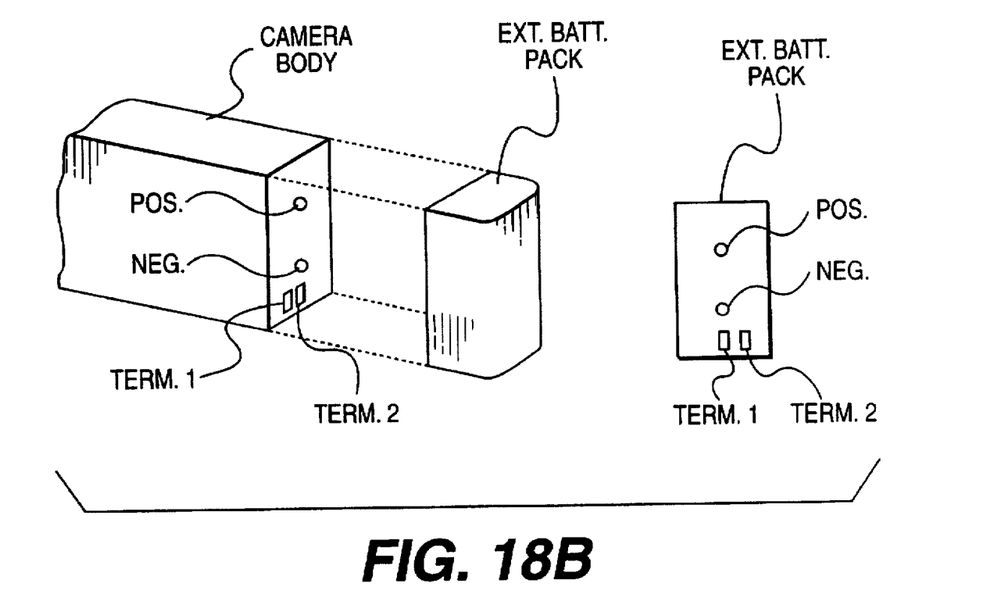
Figure 19A:
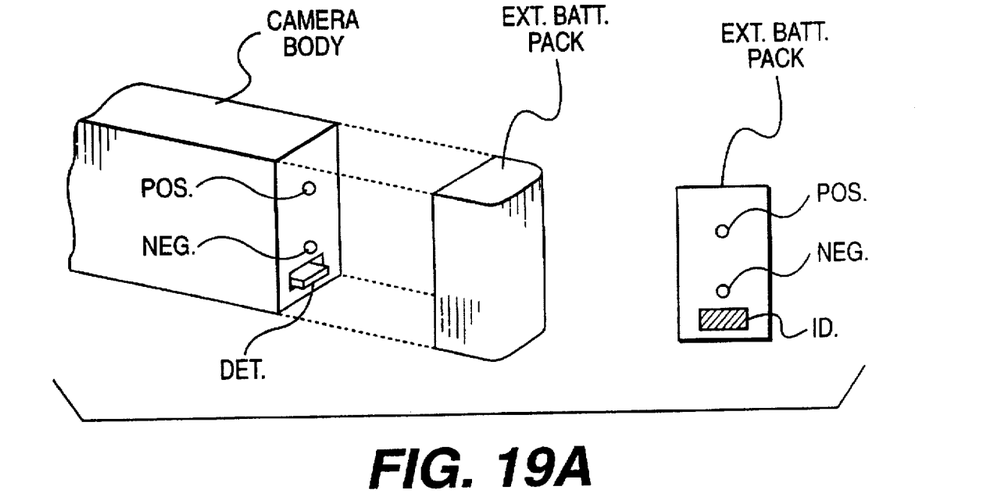
Figure 19B:
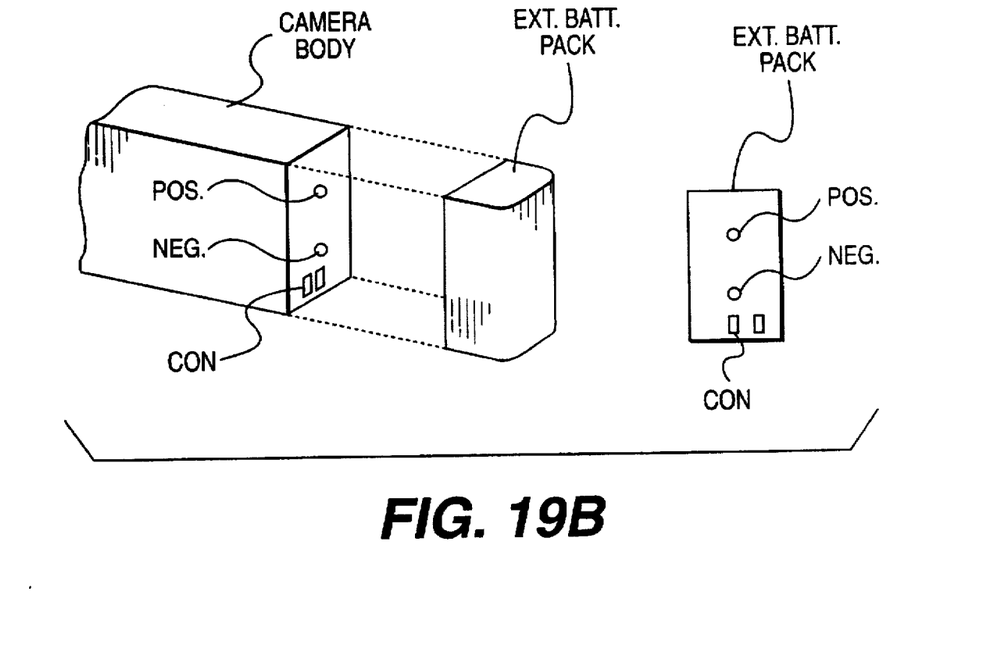

The first through the sixth embodiments are described as such cameras that the batteries or the battery packs are loaded into the loading chambers provided in the camera bodies, however, an external battery pack can be connected to the camera body as shown in FIGS. 18 and 19. Explanations for FIGS. 18 and 19 are given below.

FIG. 18(a) illustrates a modification of the first embodiment. In this modification, an external battery pack is connected to a camera body by a positive and a negative. The operation of this embodiment is similar to that of the first embodiment.

FIG. 18(b) illustrates a modification to the third embodiment. In this modification, an external battery pack is connected to a camera body, by a positive terminal, a negative terminal, a power source code contact 1, and a power source code contact 2 of the external battery pack. The operation of this embodiment is similar to that of the third embodiment.

FIG. 19(a) illustrates a modification of the fourth embodiment. In this modification, an external battery pack is connected to a camera body, by a positive terminal and a negative terminal of the external battery pack. In this embodiment, a power source type detector, which acts as the power source type detecting member 806 of the fourth embodiment, is provided on an exterior portion of the camera body, facing to the external battery pack. A power source type identifier portion is provided on an exterior portion of the external battery pack, facing to the camera body. The type of the external battery pack is detected by the difference in the shape of tip portion of the power source identifier on the external battery pack connected to the camera body. The operation of this embodiment is similar to that of the fourth embodiment.

FIG. 19(b) illustrates a modification of the fifth embodiment. In this modification, an external battery pack is connected to a camera body, by a positive terminal, a negative terminal, and a communication terminal which are connected to a ROM (Read Only Memory device) in the external battery pack. The operation of this embodiment is similar to that of the fifth embodiment.

The cameras of above mentioned embodiments may also employ different types of power sources such as an alkali-manganese battery, a manganese battery, nickel-cadmium battery, nickel-hydrogen battery, lead battery, and metallized lithium secondary battery, for example.

It is understood that changes and modifications may be made in the particular embodiments of the invention described without departing from the scope of the invention as defined by the appended claims.

What is claimed is:

1. Battery check apparatus of a camera capable of using one of different type of power sources, comprising:
   (a) connecting means for connecting both terminals of the power source loaded in said camera to electric circuits provided in said camera;
   (b) judging means for judging a type of said power source connected to said connecting means; and
   (c) checking means, including a central processing unit, for checking residual capacity of said power source with setting a suitable measuring condition on the basis of the output of said judging means,
   wherein said checking means changes over dummy load current in response to a type of said power source.

2. Battery check apparatus of a camera capable of using one of different types of power sources, comprising:
   (a) connecting means for connecting both terminals of the power source loaded in said camera to electric circuits provided in said camera;
   (b) judging means for judging a type of said power source connected to said connecting means; and
   (c) checking means, including a central processing unit, for checking residual capacity of said power source with a suitable measuring condition on the basis of the output of said judging means,
   wherein said checking means changes over a dummy load resister for loading said power source in response to a type of said power source.

3. Battery check apparatus of a camera capable of using one of different type of power sources, comprising:
   (a) connecting means for connecting both terminals of the power source loaded in said camera to electric circuits provided in said camera;
   (b) judging means for judging a type of said power source connected to said connecting means; and
   (c) checking means, including a central processing unit, for checking residual capacity of said power source with a suitable measuring condition on the basis of the output of said judging means,
   wherein said checking means changes over a dummy load applying period of time in response to the type of said power source.

4. Battery check apparatus of a camera capable of using one of different type of power sources, comprising:
   (a) connecting means for connecting both terminals of the power source loaded in said camera to electric circuits provided in said camera;
   (b) judging means for judging a type of said power source connected to said connecting means; and
   (c) checking means, including a central processing unit for checking residual capacity of said power source with a suitable measuring condition on the basis of the output of said judging means
   wherein said checking means changes over the measuring condition in response to the type and surface temperature of said power source.

5. Check apparatus of a camera capable of using one of different type of power sources, comprising:
   (a) judging means for judging a specific type of the power source loaded in the camera;
   (b) checking means for checking residual capacity of said power source with a suitable measuring condition on the basis of an output of said judging means
   wherein said measuring condition is a condition for setting a dummy load of said power source.

6. Power source check apparatus comprising:

(a) judging means for judging a type of power source connected thereto and for generating a type of data concerning said type of said power source;

(b) setting means for setting a measuring parameter in response to said type data and for generating a reference level; and (c) residual capacity detecting means for determining if said power source can be used with said reference level, wherein said setting means changes over said reference level in response to surface temperature of said power source or ambient temperature.

7. An apparatus which is operable, powered by one of different types of power sources, said apparatus comprising:

a connector which connects said power source to said apparatus;

a discriminator which discriminates a type of said power source connected to the connector; and a detector which detects residual capacity of said power source on the basis of output from said discriminator, wherein said detector applies a dummy load to said power source.

* * * * *